United States Patent
Kim et al.

(10) Patent No.: US 11,389,993 B2
(45) Date of Patent: Jul. 19, 2022

(54) VEHICLE INTERIOR MATERIAL MANUFACTURING APPARATUS AND METHOD FOR MANUFACTURING VEHICLE INTERIOR MATERIAL

(71) Applicants: HYUNDAI MOTOR COMPANY, Seoul (KR); KIA MOTORS CORPORATION, Seoul (KR); SEOYON E-HWA CO., LTD., Seoul (KR)

(72) Inventors: Hak Soo Kim, Yongin-si (KR); Yongho Kim, Seoul (KR); Hanki Lee, Seoul (KR); Mungyu Bak, Seoul (KR); Juseong Park, Suwon-si (KR); Seong Kwon Go, Asan-si (KR); Chi Won Yoon, Cheonan-si (KR)

(73) Assignees: Hyundai Motor Company, Seoul (KR); Kia Motors Corporation, Seoul (KR); Seoyon E-HWA Co., Ltd., Seoul (KR)

( * ) Notice: Subject to any disclaimer, the term of this patent is extended or adjusted under 35 U.S.C. 154(b) by 651 days.

(21) Appl. No.: 15/833,303

(22) Filed: Dec. 6, 2017

(65) Prior Publication Data
US 2019/0111592 A1   Apr. 18, 2019

(30) Foreign Application Priority Data
Oct. 12, 2017   (KR) .................. 10-2017-0132038

(51) Int. Cl.
*B29C 41/50* (2006.01)
*B29C 45/14* (2006.01)
(Continued)

(52) U.S. Cl.
CPC .............. *B29C 41/50* (2013.01); *B29C 33/02* (2013.01); *B29C 33/34* (2013.01);
(Continued)

(58) Field of Classification Search
None
See application file for complete search history.

(56) References Cited

U.S. PATENT DOCUMENTS 5,415,536 A * 5/1995 Ohno ................. B29C 45/1418
425/121
5,637,330 A * 6/1997 Younessian ............. B29C 51/30
425/183

(Continued)

FOREIGN PATENT DOCUMENTS

CN      102712120 A    10/2012
CN      105856477 A    8/2016
(Continued)

OTHER PUBLICATIONS

Chinese Office Action dated Jan. 6, 2021 issued in Chinese Patent Application No. 201711283079.3 (with English translation).
(Continued)

*Primary Examiner* — Jacob T Minskey
*Assistant Examiner* — Caroline Beha
(74) *Attorney, Agent, or Firm* — Morgan, Lewis & Bockius LLP

(57) ABSTRACT

A vehicle interior material manufacturing apparatus includes a preheater for preheating a raw fabric, a mover for moving the preheated raw fabric and including a stretching jig movable back and forth, a first mold into which the preheated raw fabric is inserted by the mover, a second mold having an at least partially corresponding shape to the first mold, and an injection resin introduced into the second mold, wherein the first mold includes: a base member on which an embossed pattern to be transferred to the preheated raw fabric is formed, a vacuum hole through which the preheated raw fabric is adsorbed onto the base member, and a spring core protruding from the base member and con-
(Continued)

tacting at least a portion of the preheated raw fabric inserted into the first mold.

4 Claims, 9 Drawing Sheets

(51) Int. Cl.
    *B29C 33/02*     (2006.01)
    *B29C 33/34*     (2006.01)
    *B29L 31/30*     (2006.01)

(52) U.S. Cl.
    CPC .... *B29C 45/1418* (2013.01); *B29C 45/14065* (2013.01); *B29C 45/14262* (2013.01); *B29C 2045/14155* (2013.01); *B29C 2791/001* (2013.01); *B29C 2791/006* (2013.01); *B29C 2791/009* (2013.01); *B29L 2031/3014* (2013.01); *B29L 2031/3041* (2013.01)

(56) References Cited

U.S. PATENT DOCUMENTS

| | | | |
|---|---|---|---|
| 5,759,588 A * | 6/1998 | Harada | B29C 33/12 264/266 |
| 6,749,794 B2 * | 6/2004 | Spengler | B29C 37/0032 264/101 |
| 10,173,362 B2 * | 1/2019 | Bartoli | B29C 51/265 |
| 2001/0027840 A1 | 10/2001 | Hagai | |
| 2005/0257998 A1 * | 11/2005 | Sato | H04R 31/00 181/167 |
| 2006/0220274 A1 * | 10/2006 | Dooley | B29C 45/14196 264/259 |
| 2011/0266721 A1 * | 11/2011 | Song | B29C 45/14262 264/511 |

FOREIGN PATENT DOCUMENTS

| | | | | |
|---|---|---|---|---|
| DE | 102006014893 A1 | 10/2006 | | |
| EP | 1284182 A2 | 2/2003 | | |
| EP | 2565008 A1 * | 3/2013 | | B29C 45/14 |
| EP | 2565008 A1 | 3/2013 | | |
| JP | 10113933 A * | 5/1998 | | |
| JP | 10113933 A | 5/1998 | | |
| JP | 10128768 A * | 5/1998 | | |
| JP | H10-128768 A | 5/1998 | | |
| JP | H11-48283 A | 2/1999 | | |
| JP | 2004-174925 A | 6/2004 | | |
| JP | 2017-056633 A | 3/2017 | | |
| KR | 10-0985311 B1 | 10/2010 | | |

OTHER PUBLICATIONS

German Office Action dated Feb. 3, 2021 issued in German Patent Application No. 201 753 (with English translation).
Translation of Korean Office Action for corresponding application No. 10-2017-013238 dated Sep. 1, 2021, 9 pages.

* cited by examiner

VEHICLE INTERIOR MATERIAL MANUFACTURING APPARATUS AND METHOD FOR MANUFACTURING VEHICLE INTERIOR MATERIAL

CROSS-REFERENCE TO RELATED APPLICATION

This application claims the benefit of priority to Korean Patent Application No. 10-2017-0132038, filed on Oct. 12, 2017 with the Korean Intellectual Property Office, the entire disclosure of which is incorporated herein by reference.

TECHNICAL FIELD

Embodiments of the present disclosure relate to a vehicle interior material manufacturing apparatus and method of manufacturing a vehicle interior material, and to a vehicle interior material manufacturing apparatus capable of reducing wrinkles of a vehicle interior material, and a method of manufacturing the same.

BACKGROUND

In general, vehicle interior materials include door trims, fillers, trunk mats, package trims, head liners, and the like, and such interior materials are made by attaching soft skin materials, on which embossed patterns are formed, on surfaces thereof to hard base materials for aesthetics and texture of the interior materials according to types of vehicles.

That is, the interior materials that include only the injection-molded hard base materials may be used depending on the type of the vehicles, but in a luxury car, soft raw fabric such as woven fabric attached to hard base materials as skin materials is commonly used.

Poly-propylene (PP), a PP felt, a PP board, acrylonitrile butadiene styrene (ABS), a wood stock, a resin felt, and the like are mainly used as the hard base materials, and materials that a polyethylene (PE) foam, a PP foam, a polyurethane (PU) foam, or the like attached to surfaces of skin sheets made of non-woven fabric, woven fabric, poly vinyl chloride (PVC), or thermoplastic polyethylene (TPO) are used as soft skin materials adhered to surfaces of the base materials.

A manufacturing method of a typical vehicle interior material in which a skin material is inserted into a mold and integrally injected includes a method in which a skin material on which an embossed pattern is formed is inserted into a mold and a resin (generally, PP as a thermoplastic resin), which is a base material, is injection molded therein in a rearward direction. The method may have problems in that a raw fabric stretches in the mold, the embossed pattern of the skin material is damaged due to a high temperature and pressure, and thus visual quality thereof is deteriorated.

SUMMARY

Therefore, it is an aspect of the present disclosure to provide a vehicle interior material manufacturing apparatus capable of reducing wrinkles of an interior material, and a method of manufacturing the same.

It is another aspect of the present disclosure to provide a vehicle interior material manufacturing apparatus capable of reducing wrinkles of a bent portion at which a flange starts, and a method of manufacturing the same.

It is still another aspect of the present disclosure to provide a vehicle interior material manufacturing apparatus capable of reducing wrinkles by decreasing a difference in an amount of compression of a raw fabric foam of a bent portion at which a flange starts and surroundings thereof, and a method of manufacturing the same.

Additional aspects of the disclosure will be set forth in part in the description which follows and, in part, will be obvious from the description, or may be learned by practice of the disclosure.

In accordance with an aspect of the embodiments, a vehicle interior material manufacturing apparatus, the apparatus comprising: a preheater configured to preheat a raw fabric; a mover configured to allow the preheated raw fabric to be movable and including a stretching jig provided to be movable back and forth; a first mold into which the preheated raw fabric is inserted by the mover; and a second mold corresponding to the first mold, wherein an injection resin is introduced into the second mold, wherein the first mold includes: a base member on which an embossed pattern to be transferred to the preheated raw fabric is formed; a vacuum hole through which the preheated raw fabric is adsorbed onto the base member; and a spring core configured to protrude from the base member and come into contact with at least a part of the preheated raw fabric inserted into the first mold.

Also, a flange shape forming portion configured to form a flange on at least a part of the raw fabric is formed in the first mold; and the stretching jig is formed in a shape corresponding to the flange shape forming portion.

Also, the spring core includes a first sliding preventer formed in an embossed shape to prevent sliding when the spring core comes into contact with the raw fabric.

Also, the stretching jig includes a second sliding preventer formed in an embossed shape to prevent sliding when the spring core comes into contact with the raw fabric.

Also, the mover includes a fixing device configured to fix the raw fabric to the first mold.

Also, a vacuum generator connected to the vacuum hole and configured to generate vacuum and allow the raw fabric to be adsorbed onto and pressed against the first mold.

Also, the first mold further includes a support member configured to press a part of the raw fabric and support the raw fabric.

According to another aspect of the present disclosure, a method of manufacturing a vehicle interior material, the method comprising: preheating a raw fabric using a preheater; moving the preheated raw fabric using a mover and inserting the preheated raw fabric into a first mold; seating the preheated raw fabric on a base member, on which an embossed pattern to be transferred to the preheated raw fabric is formed, and a spring core in a state in which the spring core is moved forward from the base member; stretching at least a part of the preheated raw fabric using a stretching jig of the mover; adsorbing the stretched raw fabric onto the base member through a vacuum hole formed in the first mold and transferring the embossed pattern to the stretched raw fabric; and injecting an injection resin through a resin injection hole of a second mold and injection molding a base material.

Also, the first mold includes a vacuum generator provided to generate vacuum through the vacuum hole and adsorb the raw fabric.

Also, the first mold further includes a support member configured to press the raw fabric.

Also, the spring core includes a first sliding preventer formed in an embossed shape.

Also, the stretching jig includes a second sliding preventer formed in an embossed shape.

Also, the spring core is restored to an original state thereof when a resin is injected into the second mold.

Also, the mover is separated from the raw fabric and is moved after the stretching jig is operated.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
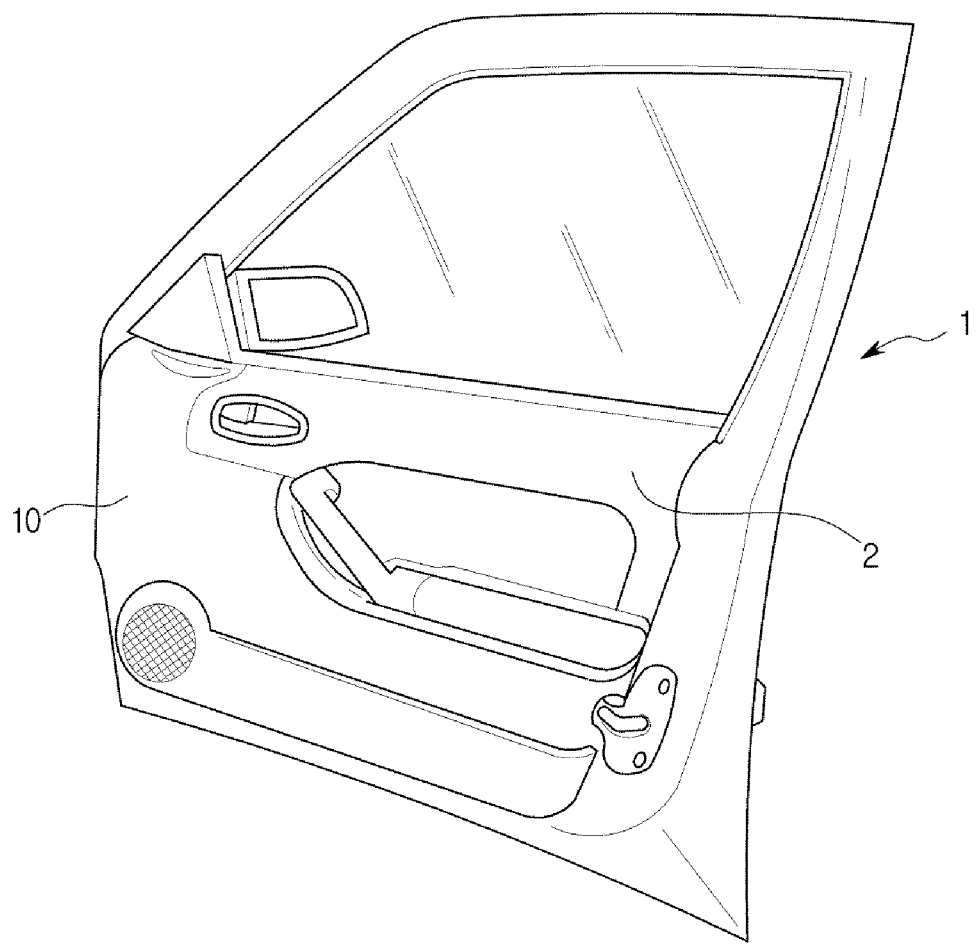
FIG. 1 is a view illustrating door trim to which a vehicle interior material is applied according to exemplary embodiments of the present disclosure.

Embodiments described in this specification and configurations illustrated in drawings are only exemplary examples of the disclosed disclosure. The disclosure covers various modifications that can be substituted for the embodiments and drawings at the time at which this application is filed.

In addition, the same reference numerals or symbols refer to parts or components that substantially perform the same function.

In addition, the terms used in the present specification are merely used to describe exemplary embodiments and are not intended to limit and/or restrict the embodiments. An expression used in the singular encompasses the expression of the plural unless the expression has a clearly different meaning in context. In the present specification, terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In addition, it should be understood that, although the terms "first," "second," and the like may be used herein to describe various elements, these elements are not limited by these terms. These terms are only used to distinguish one element from another. For example, a first element could be termed a second element, and, similarly, a second element could be termed a first element without departing from the scope of the present disclosure. As used herein, the term "and/or" includes any and all combinations of one or more of the associated listed items.

Meanwhile, terms used in the specification, such as "front end," "back end," "upper portion," "lower portion," "upper end," and "lower end" are defined on the basis of the drawings, and shapes and positions of components are not limited by the terms.

In the following description, a vehicle refers to various apparatuses which move an object such as a person, a thing, or an animal to be transported from a starting point to a destination. The vehicle may include a vehicle which travels on a road or track, a vessel which moves over a sea or river, an aircraft, and the like.

In addition, the vehicle which travels on the road or track may move in a predetermined direction according to a rotation of at least one wheel thereof, and may include, for example, three- or four-wheeled vehicles, construction machines, two-wheeled motorcycles, prime movers, bicycles and trains that run on a track.

Hereinafter, exemplary embodiments according to the present disclosure will be described in detail with reference to the accompanying drawings. The present disclosure may be applied to all parts of vehicles to which interior materials are applied. For example, door trim to which a vehicle interior material is applied will be described as one example.

Figure 2:
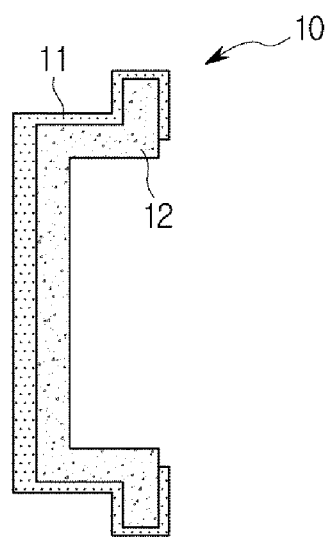
FIG. 2 is a cross-sectional view illustrating a vehicle interior material according to exemplary embodiments of the present disclosure.
Figure 3:
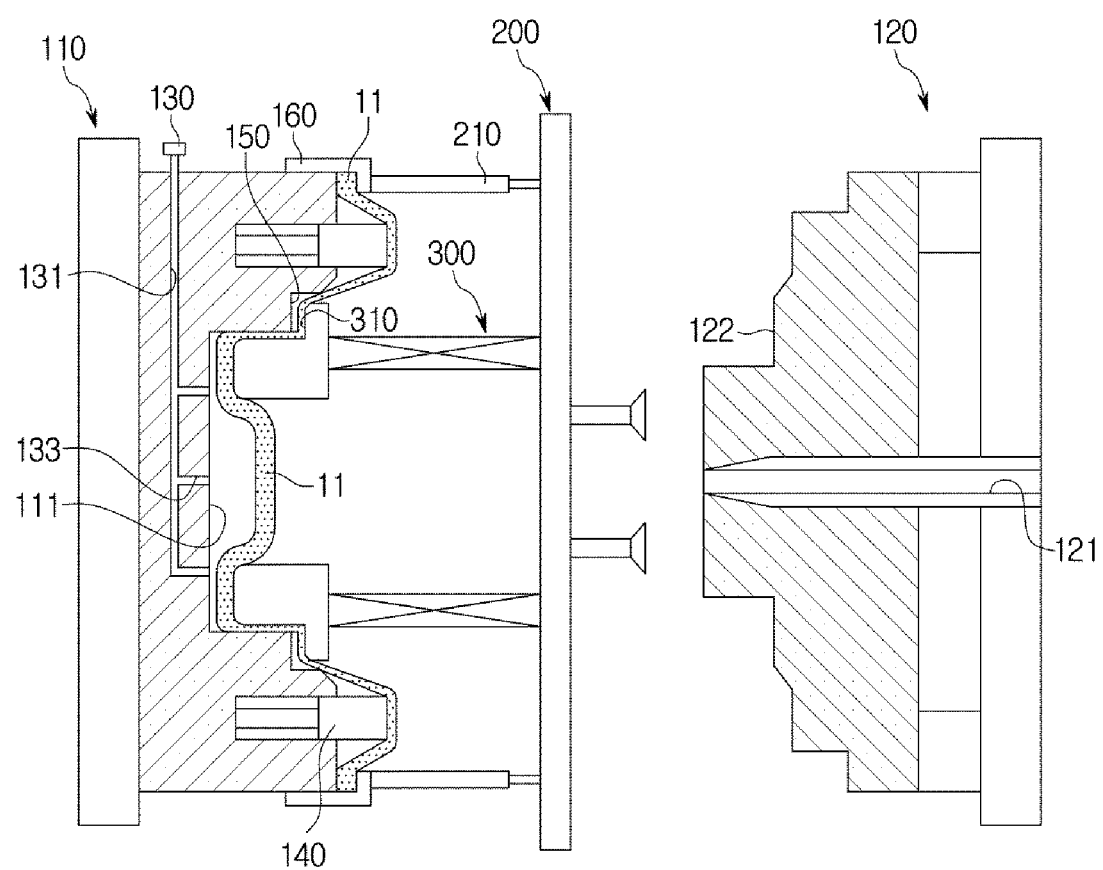
FIG. 3 is a view illustrating a vehicle interior material manufacturing apparatus according to exemplary embodiments of the present disclosure.
Figure 4:
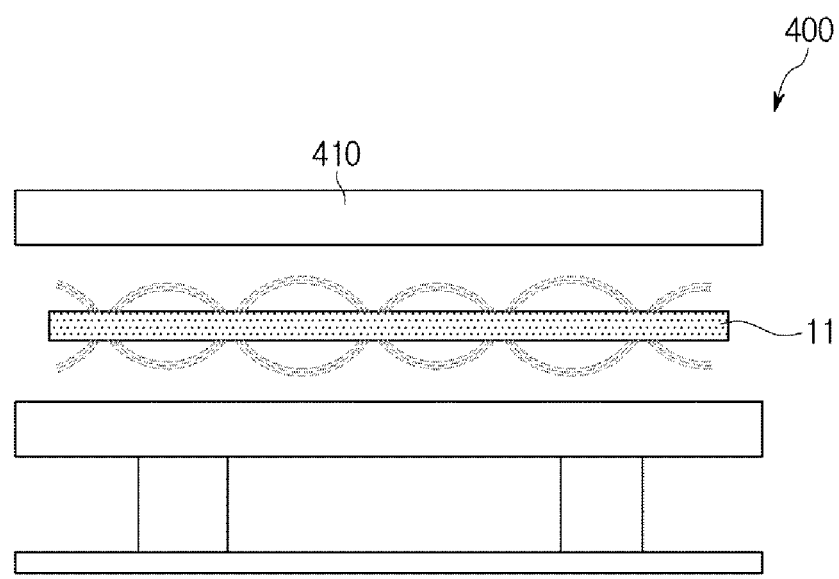
FIGS. 4 to 9 are views illustrating a vehicle interior material manufacturing process according to exemplary embodiments of the present disclosure.
Figure 5:
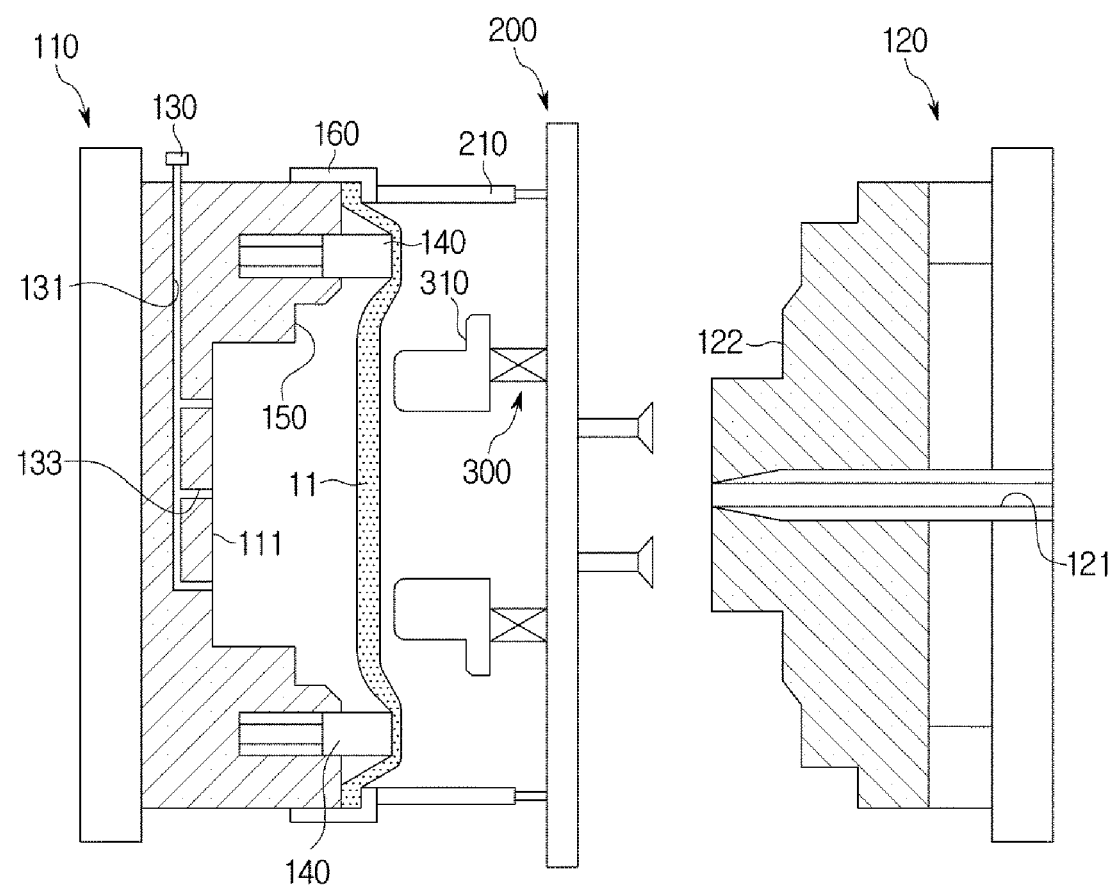
Figure 6:
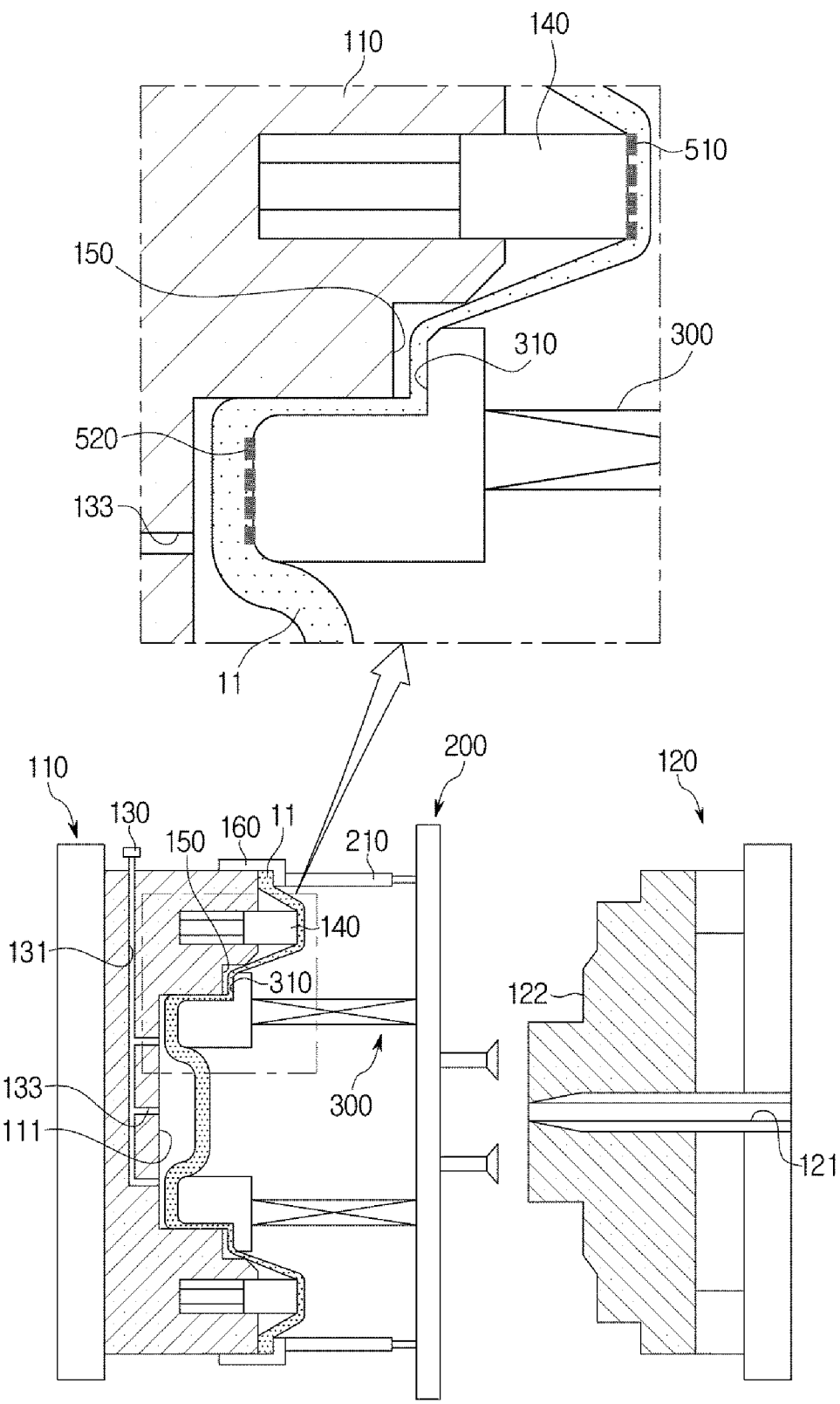
Figure 7:
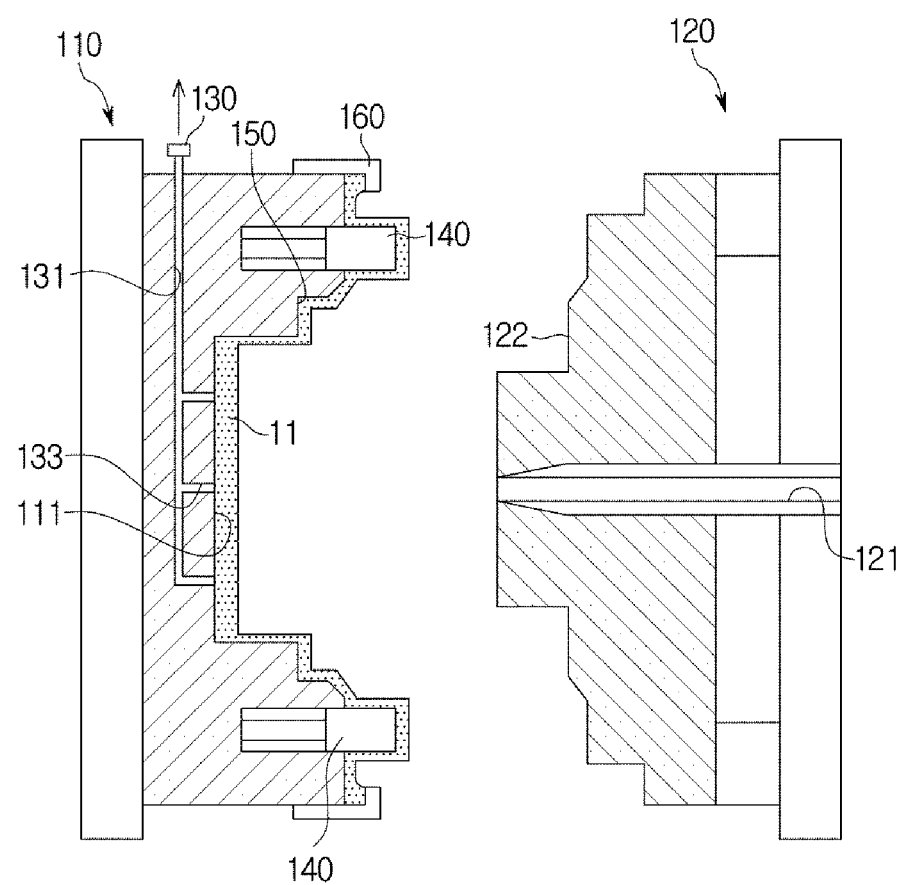
Figure 8:
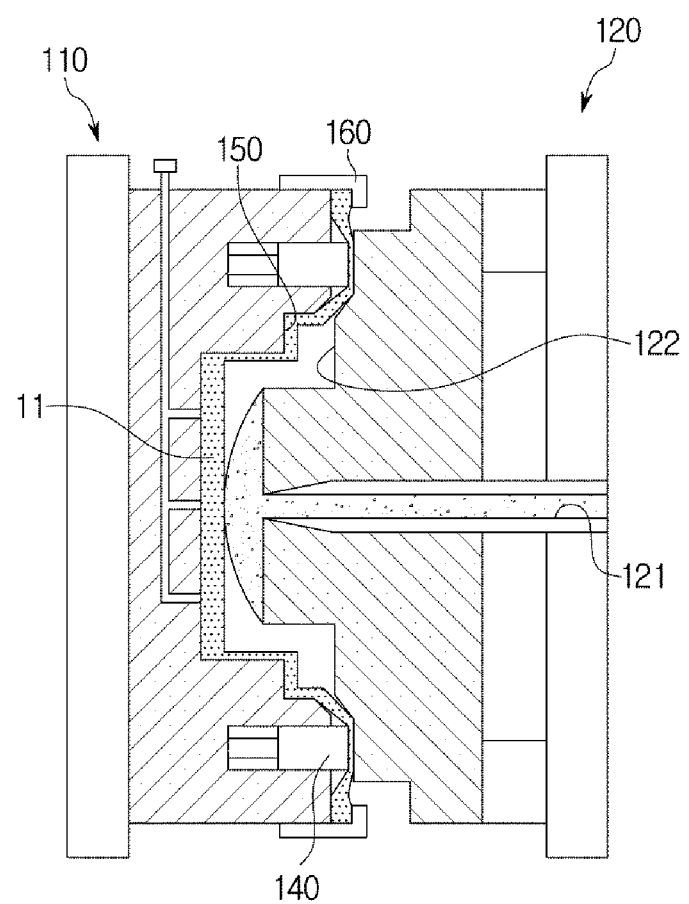
Figure 9:
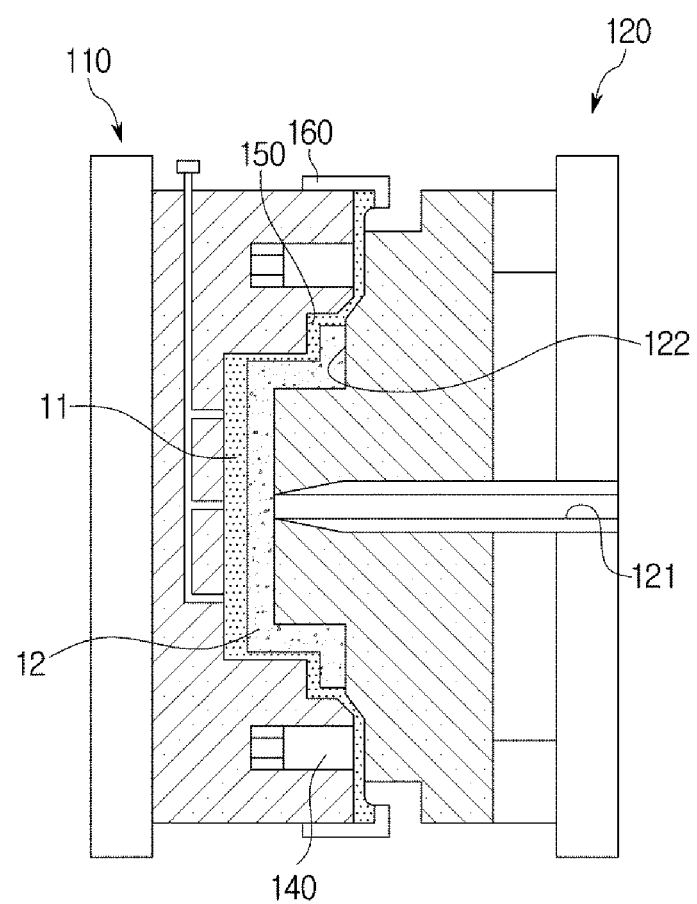

FIG. 1 is a view illustrating a door trim to which a vehicle interior material according to an exemplary embodiment of the present disclosure is applied, FIG. 2 is a cross-sectional view illustrating a vehicle interior material according to exemplary embodiments of the present disclosure, FIG. 3 is a view illustrating a vehicle interior material manufacturing apparatus according to exemplary embodiments of the present disclosure, and FIGS. 4 to 9 are views illustrating a vehicle interior material manufacturing process according to exemplary embodiments of the present disclosure.

As illustrated in FIGS. 1 to 4, door trim 2 provided on a vehicle door 1 is an interior material 10 provided inside the door and serves to block and absorb sound and alleviate an impact caused by collision.

The interior material 10 may be formed by attaching a soft skin material (hereinafter, a raw fabric) having an embossed pattern formed on a surface thereof to a hard base material 12. The raw fabric 11 is a surface exposed to an interior of a vehicle, and may be formed with woven fabric such as a cloth.

The raw fabric 11 may be formed as a dual structure including a relatively thin skin layer on which the embossed pattern is formed and a relatively thick foam layer for supporting the skin layer and generating a cushioned feeling.

The vehicle interior material manufacturing apparatus for integrally manufacturing the raw fabric 11 and the base material 12 of the vehicle interior material 10 includes, in some embodiments, a first mold 110, a second mold 120 and a mover 200.

The first mold 110 is provided such that the raw fabric 11 preheated by a preheater 400 is inserted into the first mold 110, and the second mold 120 is installed to be parallel to the first mold 110 and is provided such that an injection resin is introduced into the second mold 120.

The mover 200 is provided to catch the raw fabric 11 and move the raw fabric 11 to the first mold 110. The mover 200 includes a stretching jig 300 provided to locally stretch the preheated raw fabric 11. The stretching jig 300 may be provided to decrease a foam thickness and minimize a difference in change in the foam thickness by stretching the preheated raw fabric 11.

Since the second mold 120 is formed as a structure for manufacturing a general vehicle interior material, a structure of the first mold 110 and the mover 200 will be mainly described in the present disclosure.

The preheater 400 may include a heater 410 as the preheater 400 for manufacturing a conventional vehicle interior material. The heater 410 heats the raw fabric 11 such that a shape of the raw fabric 11 is easily formed.

The mover 200 catches the preheated raw fabric 11 and inserts the preheated raw fabric 11 into the first mold 110.

A fixing device 210 for perpendicularly attaching the preheated raw fabric 11 to the mover 200 is provided in the mover 200. The fixing device 210 may attach the raw fabric to the fixing device 210 by vacuum adsorbing an edge thereof and detach the raw fabric 11 from the fixing device 210. In addition, the mover 200 may be formed to move toward the first mold 110 in a state in which the preheated raw fabric 11 is attached to the fixing device 210, and may include, for example, a teaching chuck and the like. In exemplary embodiments of the present disclosure, an example of a method by which the fixing device 210 of the mover 200 catches the raw fabric through a vacuum adsorption method is described, but the present disclosure is not limited thereto.

The first mold 110 includes support members 160 configured to fix an edge of the preheated raw fabric 11 inserted from the mover 200 and support the preheated raw fabric 11, and the support members 160 are installed at upper, lower, left and right sides of the first mold 110, and clamp and seal the edge of the preheated raw fabric 11.

The first mold 110 includes a base member 111 on which an embossed pattern to be transferred to the preheated raw fabric 11 is formed. The first mold 110 includes a vacuum hole 133 such that the preheated raw fabric 11 is vacuum adsorbed onto the base member 111. The first mold 110 includes a vacuum generator 130 connected to the vacuum hole 133 and, the vacuum generator 130 generates a vacuum. The vacuum hole 133 and the vacuum generator 130 may be connected to an inlet hole 131. The preheated raw fabric 11 is adsorbed onto and pressed against the first mold 110 through the vacuum hole 133 by the vacuum generated by the vacuum generator 130.

The first mold 110 includes a spring core 140 protruding from the base member 111 and contacting the preheated raw fabric 11. The spring core 140 is movable toward and away from first mold 110. When the preheated raw fabric 11 is moved by the mover 200 and inserted into the first mold 110, the spring core 140 moves forward and contacts the preheated raw fabric 11 positioned to protrude from the base member 111 of the first mold 110 and inserted into the first mold 110.

A first sliding preventer 510 for preventing sliding when the spring core 140 comes into contact with the raw fabric 11 may be formed on the spring core 140. The first sliding preventer 510 may be formed in an embossed shape. The first sliding preventer 510 may be formed at an end portion of the spring core 140. The first sliding preventer 510 may be formed at a portion of the spring core 140 which comes into contact with the raw fabric 11.

A flange shape forming portion 150, for forming a flange shape on at least a part of the raw fabric 11, is formed on the first mold 110. The flange shape forming portion 150 may be formed to be stepped from the base member 111. The spring core 140 may be disposed outside the flange shape forming portion 150 of the first mold 110. The spring core 140 may be disposed at an edge of the first mold 110.

Accordingly, in a state in which the edge of the raw fabric 11 is fixed to the fixing device 210 of the mover 200 through a vacuum adsorption method, the raw fabric 11 is moved and inserted into the first mold 110. Here, the spring core 140 of the first mold 110 comes into contact with, and supports, the preheated raw fabric 11 in a state in which the spring core 140 is moved forward.

In a state in which the first mold 110 is open, the spring core 140 is provided to protrude toward an outside of the flange shape forming portion 150, and when the second mold 120 is closed for injection molding, the spring core 140 is compressed by a pressure of the second mold 120.

The stretching jig 300 of the mover 200 is formed to have a shape corresponding to the flange shape forming portion 150 of the first mold 110. The stretching jig 300 is installed to be movable forward and backward by the mover 200. When the preheated raw fabric 11 is inserted into the first mold 110, the stretching jig 300 moves forward and presses the preheated raw fabric 11 against the flange shape forming portion 150. A flange portion of the preheated raw fabric 11 may be locally stretched by the stretching jig 300.

A second sliding preventer 520 for preventing sliding when the stretching jig 300 comes into contact with the raw fabric 11 may be formed on the stretching jig 300. The second sliding preventer 520 may be formed in an embossed shape. The second sliding preventer 520 may be formed at an end portion of the stretching jig 300. The first sliding preventer 510 can be formed such that the stretching jig 300 may stably press the raw fabric 11 at a portion at which the stretching jig 300 comes into contact with the raw fabric 11.

When the stretching jig 300 is moved backward by the mover 200, the mover 200 is separated from the first mold 110 and moved.

At the same time, the preheated raw fabric 11 is vacuum adsorbed onto the first mold 110 by the vacuum hole 133 of the first mold 110.

Here, a base member 111, in which an embossed pattern to be transferred to the preheated raw fabric 11 is formed, is provided on an inner circumferential surface of the first mold 110. The base member 111 is formed by forming the embossed pattern to be transferred to the raw fabric 11 through performing a method of etching, laser processing or the like on the inner circumferential surface of the first mold 110.

The second mold 120 is provided to face the first mold 110 and integrally form the raw fabric 11 inserted into the first mold 110 and the base material 12. A molding device 122 having a shape corresponding to the first mold 110 is provided in the second mold 120. The molding device 122 forms a molding space (cavity) for manufacturing a product together with the first mold 110.

A resin injection hole 121 through which an injection resin is injected into the second mold 120 is formed in the second mold 120. The resin injected through the resin injection hole 121 is injection molded at a low temperature and is used to manufacture the interior material 10 in which the raw fabric 11 and the base material 12 are integrally formed.

Meanwhile, a vehicle interior material manufacturing method for manufacturing the vehicle interior material 10 according to exemplary embodiments of the present disclosure will be described below.

The raw fabric 11 is preheated by the preheater 400, and the preheated raw fabric 11 is moved by the mover 200 and inserted into the first mold 110.

Here, the spring core 140 of the first mold 110 is provided in a state in which the spring core 140 is moved forward from the base member 111.

The preheated raw fabric 11 is seated on the first mold 110 in which the base member 111, on, or in, which an embossed pattern to be transferred to the preheated raw fabric 11 is formed, and the spring core 140 are provided.

The stretching jig 300 of the mover 200 is moved forward to press the preheated raw fabric 11 against the flange shape forming portion 150 to stretch the preheated raw fabric 11, and, at the same time, the preheated raw fabric 11 is adsorbed onto the base member 111 through the vacuum hole 133 formed in the first mold 110, and the embossed pattern is transferred to a surface of the preheated raw fabric 11.

In addition, the stretching jig 300 of the mover 200 is moved backward to separate the mover 200 from the first mold 110, and the mover 200 thus is moved.

Here, the preheated raw fabric 11 may be pressed by the support member 160 of the first mold 110 and fixed to the first mold 110.

An injection resin can be injected through the resin injection hole 121 of the second mold 120, and the base material 12 and the raw fabric 11 can be integrally injection molded at a low temperature. Here, the spring core 140 may be compressed and restored to an original state thereof when the first mold 110 and the second mold 120 are completely closed.

The completely formed interior material 10 may be automatically unloaded by the mover 200. Here, a post process in which the raw fabric 11 covers an edge of the base material 12 may be further included in the method.

Meanwhile, after the first mold 110 and the second mold 120 are opened, the preheated raw fabric 11 may be inserted into the first mold 110 using the mover 200 for the subsequent process.

As is apparent from the above description, there is an effect in that visual quality can be improved by reducing wrinkles of a bent portion at which a flange starts.

In addition, there is an effect in that wrinkles of an exterior can be solved, prevented and/or reduced by reducing a difference in an amount of compression of a raw fabric foam of a bent portion at which a flange starts and surroundings thereof.

Although some embodiments of the present disclosure have been shown and described above, the disclosure is not limited to the aforementioned specific exemplary embodiments. Those skilled in the art may variously modify the disclosure without departing from the gist of the disclosure claimed in the appended claims.

What is claimed is:

1. A vehicle interior material manufacturing apparatus, the apparatus comprising:
   a preheater for preheating a raw fabric;
   a mover for moving the preheated raw fabric and including a stretching jig movable back and forth;
   a first mold into which the preheated raw fabric is inserted by the mover;
   a second mold having an at least partially corresponding shape to the first mold; and
   an injection resin introduced into the second mold,
   wherein the first mold includes:
      a base member on which an embossed pattern to be transferred to the preheated raw fabric is formed;
      a flange shape forming portion for forming a flange on at least a part of the raw fabric is formed in the first mold and formed to be stepped from the base member;
      a vacuum hole through which the preheated raw fabric is adsorbed onto the base member; and
      a spring core protruding from the base member and contacting at least a portion of the preheated raw fabric inserted into the first mold, the spring core is movable toward and away from the first mold,
   wherein the stretching jig is formed in a shape corresponding to the flange shape forming portion,
   wherein the spring core includes a first sliding preventer formed in a plurality of embossed shapes to prevent sliding when the spring core comes into contact with the raw fabric,
   wherein the stretching jig includes a second sliding preventer formed in a plurality of embossed shapes to prevent sliding when the spring core comes into contact with the raw fabric, and the second sliding preventer is formed at an end portion of the stretching jig formed in the shape corresponding to the flange shape forming portion, and
   wherein the plurality of embossed shapes of the first sliding preventer and the plurality of embossed shapes of the second sliding preventer are protruding in opposite direction.

2. The apparatus of claim 1, wherein the mover includes a fixing device for fixing the raw fabric to the first mold.

3. The apparatus of claim 1, further comprising a vacuum generator connected to the vacuum hole for generating a vacuum, and thereby adsorbing and pressing the raw fabric against the first mold.

4. The apparatus of claim 1, wherein the first mold further includes a support member for pressing a part of the raw fabric and support the raw fabric.

* * * * *